April 25, 1944.  J. H. GOODE  2,347,600
MOLDING PLASTIC MATERIALS
Filed June 3, 1942
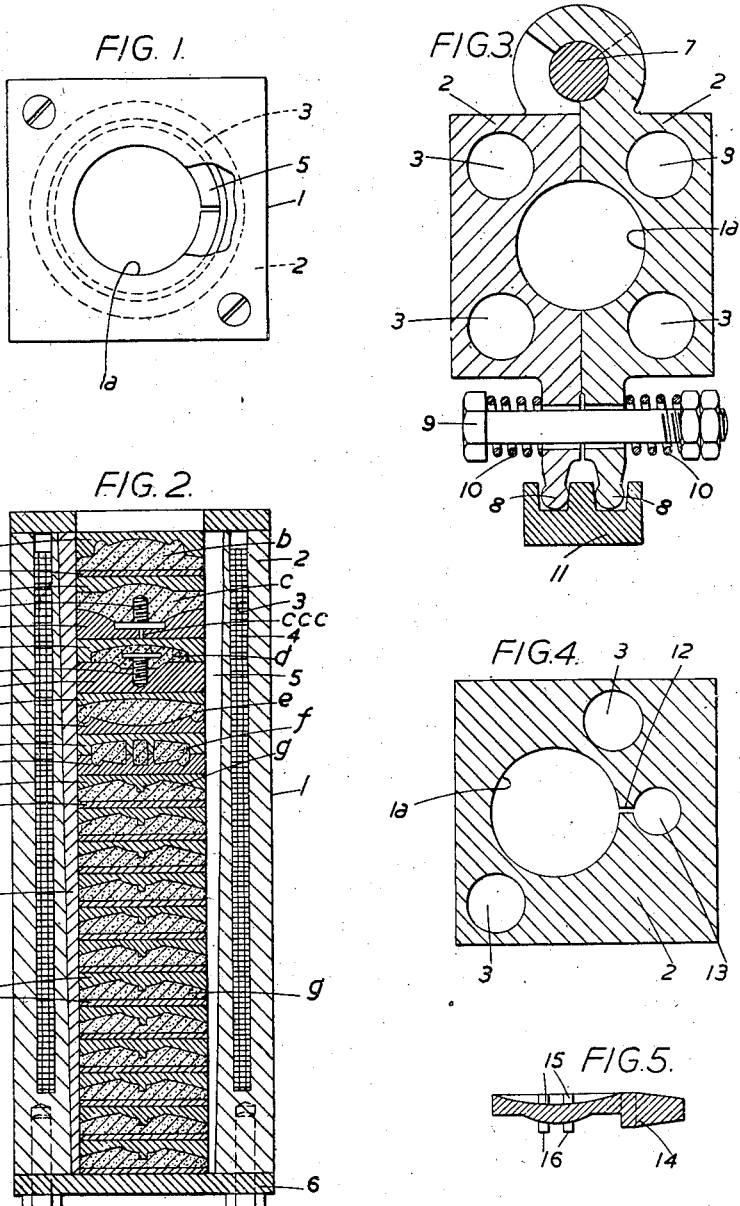
INVENTOR
John Howard Goode
BY
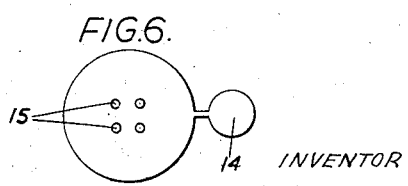
ATTORNEYS Patented Apr. 25, 1944

2,347,600

UNITED STATES PATENT OFFICE 2,347,600

MOLDING PLASTIC MATERIALS

John Howard Goode, North Holmwood, England

Application June 3, 1942, Serial No. 445,581
In Great Britain May 30, 1941

4 Claims. (Cl. 18—5)

This invention is designed to provide an improved method and apparatus for molding or forming various articles and is concerned with molding or forming a number of articles simultaneously.

By the method of this invention articles can be molded or formed from plastic materials, that is to say substances or mixtures which can be formed by dies under pressure in appropriate conditions, and including thermoplastic and appropriate thermosetting materials, a number of blanks or pellets or predetermined quantities of powdered or fluid material (all hereinafter for convenience included in the term "charge") being arranged with molding or forming dies between respective charges within the bore of a mold designed to retain dies in alignment to form a series with applied pressure being transmitted through the series, any air and surplus material being released from the edges of the die members into a vent running longitudinally of the bore, the dies having projections into the vent and the pressure being continued until the adjacent projections come into contact.

The edges of the finished articles may take the shape of the interior of the bore of the mold, or the dies may also form the edges, or edge-forming pieces may be placed in position surrounding the material between the dies, or in forming perforated articles rigid members may be introduced. For example, in forming rings or annuli the mold may have a cylindrical bore and a solid cylindrical member within and coaxial with the bore, so that this cylindrical member forms the surfaces of the internal edges of the rings.

In some cases it may be useful to use a sleeve to form the bore. For example, an elastic sleeve having an external surface approximating to that of a hollow truncated cone may be introduced to a hole having a surface of the same character in a block so that the two conical surfaces of the sleeve and the block respectively interact to take up the elasticity of the sleeve to the extent necessary to reduce the internal dimensions of the sleeve to those desirable for the formation of articles within the sleeve, then after formation the sleeve is extracted from the block; the split in a sleeve may be used to house a locating means on the dies as well for an escape for superfluous material or gas. Such a sleeve, particularly when used in a block with a tapering hole, may be used as a device to adjust the size of the molding-bore as the surface of the last wears away during use.

Pressure can be applied to the dies and charges from either end or from both ends of the series either instantaneously or in progressively greater followed by progressively less amounts or any other sequence of changes of pressure according to the nature of the material or the article and in some cases pressure is applied to the series from other directions, for example to resist any tendency of the pressure applied from the end to deflect the series or any of its component parts from the correct position. Preferably the pressure would be applied through a spring or other cushion which provides a means for regulating and limiting the pressure applied to the series. In other cases fluid pressure may be applied either continuously or intermittently. It will be apparent that there are many other arrangements by which intermittent or continuous pressure or successive periods of continuous pressure followed by a succession of intermittent impulses, or other pressure cycles according to the particular apparatus and material under treatment, may be applied.

Heating or cooling or both of the series of dies and charges can readily be carried out during the process. With certain materials heat is essential to the formation of the finished article. The appropriate heat-conditioning may be obtained by applying an even heat to the charges, or by devices which apply progressively greater or progressively less heat. Subsequently the heating may be continued to an even higher temperature to permit the extraction of the article or alternatively (especially in the case of some materials) the mold might be cooled so as to facilitate extraction.

The invention is illustrated in some typical forms by the accompanying drawing in which:

Fig. 1 is a plan view of a mold,

Fig. 2 is a sectional elevation of the same showing also typical forms of dies,

Fig. 3 is a cross-section of another form of mold,

Fig. 4 is a cross-section of another form of mold,

Figs. 5 and 6 are an elevation and plan respectively of a die suitable for use in the mold of Fig. 4.

As shown at Figs. 1 and 2 means I having a bore Ia for carrying dies and charges includes a block 2, provided with one or more chambers 3 for receiving one or more heating elements 4. A resilient split sleeve 5 surrounds and defines the bore Ia and has a slightly tapered or conical outer wall engaged by the similarly tapered or conical inner wall of the block 2. Thus when the sleeve 5 is inserted from the upper or open end and secured by the upper cover 2a of the block 2 the sleeve 5 will contract to the required size of the bore. A bottom cover enclosing the bore is shown at 6.

A number of different parts are shown being molded by suitable dies. Thus the parts BB represent a die forming a button b without holes and with shaped face and flat back: the edges are formed by the surface of the bore. Parts CC form a composite die forming an instrument knob c with a threaded hole, which is formed by the screw cc which has a slotted head to facilitate the removal of this part cc of the die for re-use; a small tapered pin ccc fits into the die below the screw so that pressure applied to the pin ccc from the exterior of the die will eject the screw cc and knob attached from the die.

Parts DD form a die forming an instrument knob d into which is molded a threaded metal pin dd with an enlarged head within the article to give it secure anchorage in the finished knob. Parts EE form a die forming a button e without holes, the edges of the button being formed by the surface of the bore. Parts FF make a die forming a button f of diameter less than that of the bore; the die forms two holes in the button. The remaining pairs of parts GG make each a die forming a button g with flat back and recessed face with a small cavity at the lowest part of the recess.

Figure 3 shows a split mold formed of two sections 2, 2 pivoted together at 7. The mold sections have guiding projections 8, 8 and are held normally closed by a bolt 9 and springs 10. By the use of a relatively moving cam track 11 applied in any suitable manner it will be clear that the two sections 2, 2 can be moved about the pivot at 7 as desired, to apply or release lateral pressure or to "breathe" the contents, that is to say give them access to the air along the line of separation of the two sections.

Fig. 4 illustrates a form in which a narrow channel 12 connects the bore 1a to another bore 13 so that excess material may escape into the bore 13, Figs. 5 and 6 showing a suitable die for forming the back of one button and the face of an adjacent button. It will be observed that the projections 14 key the dies, to ensure that the pegs 15 and 16 on adjacent dies register, while permitting the escape of surplus material from between each pair of dies until the whole series come into contact.

It will have been observed that when the articles are extracted from the mold or guides it is possible with some materials or by suitable design of dies or mold to extract either the articles or dies and articles together in a compact mass and in that state certain other operations for example machining operations or operations for the removal of surplus material may be conducted upon them while in the mass, and advantage gained by operation on them in the mass. Where dies are not interposed or if interposed by their design do not interfere with the operations it is possible with advantage to conduct machining operations, e. g. drilling of holes on the mass of articles within the mold.

In some cases (e. g. where other parts or faces have to be molded in) more than one article may be molded between dies, but such cases are included in the definition of a "charge." Moreover, in certain cases where the opposite faces of the articles interfit and the charges are in the form of blanks merely distorted not shapeless it may suffice to separate charges by a flexible layer such as cloth or a layer of dust-powder, which can then be regarded as taking the place of a die. Occasionally the materials of such blanks may be incompatible and not liable to adhere at the temperature and pressure required to form them and in such case the process may be modified by omitting the dies altogether. An example is the case where a shaped plunger operates at the end of the mold either to insert the charge to the bore or to exert pressure to form the charge or both, and the article is retained in that form through subsequent stages by the confines of the bore as well as the adjacent surfaces of the article last previously formed and also of the article next subsequently formed.

It will further be apparent that metal components or other parts not necessarily metal to be molded into the finished articles may be introduced as in other methods of molding and the mold and dies designed accordingly.

It will also have been observed that the invention envisages the use of machines not only to carry out the process of forming or molding by pressure transmitted through a series of dies and charges (or in certain cases through charges only) but in addition in the same machines to control the temperatures and pressures and assembly and location and disassembly and breathing of, and removal of surplus material from molds and dies and charges (including component parts of any of these) and combined with known means for measuring and preforming of charges and any other operations upon the product all or any combination of which controls and operations may be required according to the material used and the product. The following example is cited of possible use of the method and apparatus of the invention. Material is fed in known manner from a hopper into the bore held in a vertical direction of a mold in which a die has first been placed and located by mechanical means operating from the other end of the bore so to locate the die that the correct amount of material is gauged by the open depth of the bore above the die; a plunger which fits the bore is then made to descend to compress the material; the plunger is then withdrawn; another die is then inserted and located by the means already described; and this sequence is repeated until the bore is filled from end to end with charges and dies. In order to enable a high production rate a number of operation-stations could be employed to which the mold would be transferred in sequence; at these stations the various operations described as necessary and variable with materials are carried out simultaneously upon the different molds at the different operation-stations so that either partly or wholly both the temperature and assembly of the mold and dies and charges are under control throughout the whole process of conversion from the initial material to the finished product.

The more specific forms illustrated are to make clear by way of example the nature of the ideas underlying the invention and how it can be carried into practice.

I claim:

1. Means for forming articles under pressure including a multiple mold comprising tubular guiding means having a bore, die members in series mounted in said bore and capable of movement along the bore and relatively to one another so as to compress charges placed between the members when pressure is applied along the series, the guiding means having a vent extending longitudinally of the bore in communication therewith, for any trapped air or surplus material, the die members being formed with projections into the vent which serve both to key the die members and are adapted to abut one another when the articles are formed.

2. Means for forming articles by pressure according to claim 1 in which the vent includes a narrow channel which connects the bore to a parallel bore.

3. Means according to claim 1 in which the bore forms the edges of articles and the die members their faces.

4. Means according to claim 1 in which the die members have one face shaped so as to form one side of an article and have the opposite face of the same die member shaped so as to form a side of the article next in the series to the former article.

JOHN HOWARD GOODE.